United States Patent [19]

DeSantis et al.

[11] Patent Number: 5,069,816
[45] Date of Patent: Dec. 3, 1991

[54] ZIRCONIUM SILICA HYDROGEL COMPOSITIONS AND METHODS OF PREPARATION

[75] Inventors: Dominick A. DeSantis, Hillsborough; Robert A. Paul, Freehold, both of N.J.

[73] Assignee: MMII Incorporated, Linden, N.J.

[21] Appl. No.: 547,387

[22] Filed: Jul. 2, 1990

Related U.S. Application Data

[63] Continuation of Ser. No. 142,144, Jan. 11, 1988, abandoned.

[51] Int. Cl.$^5$ .......................... B01J 13/00; B01J 21/08
[52] U.S. Cl. ........................... 252/315.5; 252/315.01; 252/315.6; 502/236; 502/242
[58] Field of Search ............... 252/315.5, 315.2, 315.6; 428/402, 404; 423/338

[56] References Cited

U.S. PATENT DOCUMENTS

| | | | |
|---|---|---|---|
| Re. 31,761 | 12/1984 | Dombro et al. | 502/236 |
| 2,477,638 | 8/1949 | Milliken et al. | 502/236 |
| 2,481,493 | 11/1947 | Blue et al. | 502/36 |
| 2,764,558 | 9/1956 | Heard et al. | 502/36 |
| 3,120,483 | 2/1964 | Hansford et al. | 502/236 X |
| 3,137,658 | 6/1964 | Drake et al. | 502/236 |
| 3,193,492 | 7/1965 | Plank et al. | 502/236 X |
| 3,714,068 | 12/1970 | Miller et al. | 502/232 |
| 4,072,796 | 2/1978 | Reinhardt et al. | 428/405 |
| 4,123,383 | 10/1978 | Ihde, Jr. | 252/321 |
| 4,225,456 | 9/1980 | Schmidt | 252/321 |
| 4,266,978 | 5/1981 | Prochazka | 252/317 X |
| 4,443,357 | 4/1984 | Maloney et al. | 252/321 |
| 4,581,292 | 4/1986 | Shinpo et al. | 428/402 |
| 4,600,646 | 7/1986 | Stout | 428/405 |

OTHER PUBLICATIONS

Guglielmi, M.; Maddalena, A.; Maxamed Xasan, Maxamud; Raccanelli, A. "Deposition of Silica–Zirconia Coatings on Glass Fibers by the Sol–Gel Method," 1st. Chim. Ind., Univ. Padova, Padua, Italy, Riv. Stn. Sper Vetro (Murano, Italy), 1984, 14(6), 241-3 (Ital).

"Dentrifices Containing Zirconium-bound Silica Acid Salts", Lion Corp. Jpn. Kokai Tokkyo Koho JP 60 48,917 (85 48,917), Cl. A61K7/16, 16 Mar. 1985, Appl. 83/152,156, 24 Aug. 1983, 21 pp.

Oskar Glenz, "Investigation of the Mechanism of Rendering Textiles Hydrophobic with Silicones," Milliand Textilber 41, 1125-9(1960).

Primary Examiner—Robert L. Stoll
Assistant Examiner—Greg M. Sweet
Attorney, Agent, or Firm—Lerner, David, Littenberg, Krumholz & Mentlik

[57] ABSTRACT

Zirconium silica hydrogels are disclosed including at least about 5 wt. % water bound as a hydrate and including silicon as $SiO_2$ in amounts of from 60 to 99 wt. % and zirconium as $ZrO_2$ in amounts of from 1 to 40 wt. %, and where substantially all of the zirconium is bound to the $SiO_2$ in the hydrogel. Hydrophobic zirconium silica hydrogels are also disclosed in which a hydrophobic component, such as organosiloxanes, organosilanes, primary and secondary higher aliphatic alcohols, and long chain amines, are bound to the surface of the hydrogel, and in which the zirconium is present in amounts sufficient to improve the stability of the hydrogels. Methods of manufacturing these zirconium silica hydrogels are also disclosed.

32 Claims, No Drawings

ZIRCONIUM SILICA HYDROGEL COMPOSITIONS AND METHODS OF PREPARATION

This is a continuation of application Ser. No. 07/142,144 filed Jan. 11, 1988, now abandoned.

FIELD OF THE INVENTION

The present invention relates to stabilized forms of hydrophilic and hydrophobic silica hydrogels. More particularly, the present invention relates to methods for producing stabilized forms of both hydrophilic and hydrophobic silica hydrogels. Still more particularly, the present invention relates to the use of such stabilized forms of hydrophilic and hydrophobic silica hydrogels in various environments, such as defoaming agents, and in resins, lacquers, rubbers, paints, coatings and greases. Still more particularly, the present invention relates to improved compositions and processes for producing hydrophilic and hydrophobic forms of silica.

BACKGROUND OF THE INVENTION

Silica, or basically silicon dioxide ($SiO_2$), is an important article of commerce which is widely used in various industries, and which is available in a wide variety of forms for these uses. These various forms of silica include both hydrophilic and hydrophobic forms of silica. Hydrophilic silica, that is silica in the forms of silica gels (hydrogels), precipitated silica, fumed silica, diatomaceous earth and the like, has a wide variety of uses in industry. Silica gels, as well as these other forms of silica, are widely used as dehumidifying and dehydrating agents, in air conditioning, the drying of compressed air and other gases, as well as liquids, such as refrigerants, and oils containing water in suspension, for the recovery of natural gasoline from natural gas, for the bleaching of petroleum and natural oils, as catalysts and as catalyst carriers in chromatography and in other fields, as anti-caking agents in chemicals, cosmetics and pharmaceuticals, in waxes to prevent slipping, and in various dietary supplements.

These materials are generally produced from alkali silicate solutions, such as sodium silicate. These, in turn, are generally produced by reacting various alkali materials, such as sodium hydroxide, sodium carbonate, potassium hydroxide, potassium carbonate, and others, with one of the various sources of silicon dioxide, such as natural quartz, diatomaceous earth, sand, flint and the like. This reaction is generally carried out in a high temperature furnace or in high temperature and high pressure reactors. Hydrogels are then generally produced by acidification with mineral acids and the like to precipitate the silica therefrom.

Hydrophobic silica in various forms has also become a staple article of commerce in a number of industries. Thus, hydrophobic silica materials, also known as organophilic silica materials, have become extremely useful as thickeners in organic substances such as resins, coatings, lacquers, paints and greases, and have been highly useful for dispersing materials on water surfaces or as defoaming agents, and anti-foaming agents. They are also formulated into various rubber compositions, used as an anti-caking material, and the like. In general, hydrophobic silicas are prepared from any of the well-known forms of hydrophilic silica, and generally by a process which affixes a hydrophobic material such as silicone or a polysiloxane oil or the like thereto. For example, U.S. Pat. Nos. 4,123,383 and 4,225,456 disclose the preparation of hydrophobic silicas by various methods including spraying silica particles with silicone oil and then heating at elevated temperatures of from about 250 to 350° C. for one-half to about two hours. The silicone oils disclosed in these patents can be polysiloxane oils of various types, and the products are used in defoamer compositions in various aqueous systems. U.S. Pat. No. 4,443,357 discloses an improvement in these defoaming compositions which uses hydrophobic alcohols instead of organo-polysiloxanes to render the silica hydrophobic. Furthermore, U.S. Pat. No. 4,072,796 discloses the production of hydrophobic silica or silicates by a process which includes treatment with organo-halosilanes.

Miller et al, U.S. Pat. No. 3,714,068 discloses yet another hydrophobic silica composition for defoaming purposes, which in this case conditions the silica surface by controlling the proportion of hydrogen-bonded and physically absorbed water molecules on that surface, and in which hydrophobizing agents, such as silicone oils, silanes, and alcohol esters are employed to replace the water molecules.

The assignee of the present application, the silica products group of MMII Incorporated, sells a commercial product designated "Grade 60Zr Sodium Zirconia Silica," which is a blend of amorphous silica, zirconium silica hydrogel, and other zirconium species, such as zircon, and which is used for anti-caking, flow conditioning, as a liquid carrier, and as a functional filler material. This hydrophilic material is prepared from the byproduct of a commercial zirconium recovery process of Magnesium Elektron Inc. of Flemington, N.J. In that process a zircon sand containing about 66 wt. % zirconium is reacted with soda ash, or sodium carbonate, at elevated temperatures of about 1,000° C. so as to create a soluble form of the zirconium. This fused form of sodium zirconyl silicate is then treated with concentrated hydrochloric or sulfuric acid in a leaching step intended to extract as much of the zirconium from this material as is possible. Thus, about 60% to 95% of the zirconium is solubilized and removed, with the remainder left in the form of a blend of silica gel, and a portion of a co-precipitated silica-zirconium gel, as well as some unreacted zircon. It is this material which has previously been discarded, but which the assignee of the present application has employed as a source of the blend constituting the commercial product identified above.

It is also well known that zirconium in various forms has utility for a number of compositions, many of which are ceramic and glass compositions. Reference is made in this regard to Guglielmi et al, "Deposition of silica-zirconium coatings on glass fibers by the sol-gel method," Ist. Chim. Ind., Univ. Padova, Padua, Italy, Riv. Stn. Sper. Vetro (Murano, Italy) 1984, 14(6), 241–3. Also, dentifrices containing synthetic amorphous zirconium-bound silicates as abrasives which are stable during storage are disclosed in "Dentifrices containing zirconium-bound silicic acid salts," as disclosed in Japanese Patent Publication No. 60 48,017 (see Chemical Abstracts, 103:76093y, vol. 103, 1985, p. 314). Furthermore, in Glenz, "Investigation of the mechanism of rendering textiles hydrophobic with silicones," Melliand Textilber, 41, 1125–9(1960), it is disclosed that cotton fibers were impregnated with a mixture of dimethyl polysiloxane derived silicones and aged methyl polysiloxane derived silicones containing zirconium compounds, which caused complete glassification of the fiber surfaces and good water repellency. However, this author specifically states that in this environment attempts to form the film in the absence of the fibers resulted in failures, and that silicone emulsions showed no substantivity toward cotton. This author thus certainly did not produce or even suggest the production of a zirconium silica hydrogel in this article.

Stabilized, porous silica bodies are disclosed in U.S. Pat. No. 4,600,646. In this patent chromatographic packings are disclosed which include specified porous silica bodies, or silica microspheres, which are contacted with various metal compounds so as to cover these spheres with a partial surface covering of metal oxide, including zirconium oxide, which are thereby hydrolytically stabilized for later chromatographic use The particular silica microspheres to which this patent are directed are known a ZORBAX packings (registered trademark of E. I. duPont de Nemours Co., Inc.) which are produced by a specific process as set forth at column 2, lines 46-64 of the '646 patent. This patent also then discloses the use of organosilane coatings to provide the desired chromatographic packing material. It can therefore be seen that there has been some utilization of zirconium compounds in various fields, and particularly those which also employ silicon chemistry for a number of purposes, but none of these developments have been based upon any general recognition of the possibility of utilizing zirconium to produce silica hydrogels having improved stability, and certainly not the myriad of potential commercially significant uses of such materials as a substitute for the silica products currently constituting almost the entire market for these compounds.

SUMMARY OF THE INVENTION

In accordance with the present invention, these and other objects have now been realized by applicants, invention of a stabilized hydrophilic zirconium and silica or silicate-containing compound. The stabilized hydrophilic zirconium and silica or silicate-containing compounds of this invention can be produced in different forms. In one such form they can comprise zirconium silica hydrogels in a substantially pure state, and they consist of at least about 5 wt. % water bound as a hydrate, and comprise silicon and zirconium, including silicon as $SiO_2$ in an amount of between about 60 and 99 wt. % of the hydrogel and zirconium as $ZrO_2$ in an amount of between about and 40 wt. % of the hydrogel, and substantially all of the zirconium is bound to the $SiO_2$ in the hydrogel. These compositions are also preferably substantially free of silica gel which is not bound to the zirconium. In a preferred embodiment, the hydrogel comprises between about 90 and 99 wt. % of the silicon, preferably between about 93 and 98 wt. % of the silicon, and between about and 10 wt. % of the zirconium, preferably between about 2 and 7 wt. % of the zirconium.

These substantially pure zirconium silica hydrogels of the present invention can be physically distinguished from the prior byproduct of commercial zirconium recovery processes discussed on page 4 of the Background Section of this application, most particularly in that they are substantially pure, do not include silica gel which is not bound to the zirconium, and are also substantially free of zirconium in other forms, such as zircon itself. Most significantly, however, they exhibit unexpectedly improved stability as compared to these prior materials, which stability can be demonstrated, for example, by their unexpectedly superior degree of hydrophobicity when subsequently hydrophobized. The above-listed components are present, however, in the filter cake produced as a byproduct of commercial zirconium recovery processes and are not present in these substantially pure zirconium silica hydrogels, and, indeed, any attempt, even if one were desirous of doing so, to render that material into a substantially pure hydrogel would be extremely difficult, time consuming, and expensive, if not impossible. On the other hand, the "substantially pure" zirconium silica hydrogels of this invention can include certain other compounds and/or impurities and still fall within the scope of this invention. For example, various salts can be present during the preparation of these hydrogels without substantially effecting their properties. These impurities can also be readily removed from the hydrogel, such as by washing or other such procedures.

In another form, the stabilized hydrophilic zirconium and silica or silicate-containing compounds of this invention comprise at least about 5 wt. % water bound as a hydrate and include silicon and zirconium, and substantially all of the zirconium is bound to the surface of the compound. This form of the stabilized hydrophilic zirconium and silica or silicate-containing compounds of this invention can thus be contrasted to the form of hydrogel which forms a portion of the prior byproduct discussed above in that it is substantially free of zirconium which is not available for bonding, i.e., which is not at the surface thereof. Therefore, a far more efficient use of zirconium takes place, particularly when the compounds are in a substantially pure form.

The presence of zirconium in each of these stabilized zirconium silica hydrogels has thus been found to impart significant properties to these hydrogels, particularly as compared to the conventional silica hydrogels which have been used commercially for many years. In particular, the presence of zirconium at the surface of the hydrogel structure appears to impart significant stability to these hydrogels, and creates the possibility of establishing increased and stronger bonding to other components, such as to hydrophobizing agents bonded to the surface of these hydrogels in order to render them hydrophobic, or to other materials, such as by cross-linking to various organic materials or resins. These hydrogels thus have increased surface areas available for such purposes, and the hydrophobic products produced from them also demonstrate improved stability as compared to the above-noted conventional silica gels rendered hydrophobic in a similar manner. Therefore, the possibilities of substituting the present hydrophilic and hydrophobic compositions for the large number of commercial products presently on the market become almost endless.

In accordance with a method of the present invention, methods for manufacturing stabilized zirconium silica hydrogels are provided which comprise precipitating an alkali metal silicate in the presence of a zirconium compound, such as a zirconium salt, in an aqueous medium in order to produce a zirconium silica hydrogel containing at least about 5 wt. % water bound as a hydrate and including silicon as $SiO_2$ in an amount of between about 60 and 99 wt. % of the hydrogel and zirconium as $ZrO_2$ in an amount of between about 1 and 40 wt. % of the hydrogel. Preferably, this method includes adjusting the pH of the hydrogel so produced in order to neutralize same. That is, these zirconium silica hydrogels will generally be formed at a pH of between about 10 and 12, and primarily to prevent redissolution this pH can be neutralized to a pH of between about 6.8 and 7.8 by the addition of an appropriate acid thereto. In a preferred embodiment, this pH adjustment is obtained by the addition of acid to the aqueous medium, such as mineral acids, including sulfuric acid and hydrochloric acid, as well as organic acids, such as acetic acid, or other acid constituents whose salts can be removed by washing, burning, or other commercially economical methods.

In accordance with a preferred embodiment of the method of the present invention, the alkali metal silicate comprises sodium silicate, and the zirconium compound can be zirconium oxide, but preferably a zirconium salt is utilized, and is particularly selected from the group consisting of zirconium chloride, zirconium oxychloride, zirconium hydrochloride, zirconium sulfate, zirconium orthosulfate, zirconium carbonate, zirconium nitrate, zirconium carboxylates, zirconium acetates, etc.

In accordance with one embodiment of the method of the present invention, the alkali metal silicate is prepared by reacting silicon dioxide with an alkali metal compound, preferably an alkali metal hydroxide such as sodium hydroxide, or an alkali metal carbonate such as sodium carbonate.

In accordance with another embodiment of the methods of the present invention, the zirconium silica hydrogel is provided by reacting zircon with an alkali metal compound at elevated temperatures, or at elevated temperatures and pressures, so as to produce a soluble zirconyl silicate, and precipitating the zirconium silica hydrogel from the soluble zirconyl silicate at a predetermined pH so as to produce the zirconium silica hydrogel containing at least about 5 wt. % water bound as a hydrate and including silicon as $SiO_2$ in an amount of between about 60 and 99 wt. % of the hydrogel and zirconium as $ZrO_2$ in an amount of between about 1 and 40 wt. % of the hydrogel. In a preferred embodiment, the reacting step is carried out in the presence of added silicon dioxide. In another embodiment, the alkali metal compound is an alkali metal hydroxide such as sodium hydroxide, or an alkali metal carbonate such as sodium carbonate, and the soluble zirconyl silicate is sodium zirconyl silicate.

In accordance with yet another embodiment of the methods of manufacturing stabilized zirconium silica hydrogels of the present invention, the method can include providing a silica-containing compound, and contacting the silica-containing compound with a zirconium compound, such as one of the zirconium salts discussed above, so as to bind zirconium to the surface of the silica-containing compound, which is preferably a silica hydrogel, and in which the zirconium is present in an amount sufficient to improve the stability of the silica-containing compound. In a preferred embodiment of this method, the zirconium is present in an amount of between about and 40 wt. % of the silica-containing compound.

In accordance with another aspect of the present invention, a stabilized hydrophobic silica-containing hydrogel is provided comprising zirconium and a hydrophobic component bound to the surface of the hydrogel, the zirconium being present in the hydrogel in an amount sufficient to improve the stability of the hydrogel. In one embodiment thereof, substantially all of the zirconium is bound to the surface of the hydrogel, or, that is, the hydrogel is substantially free of zirconium which is not available for bonding. In a preferred embodiment, the hydrogel is substantially pure. The hydrophobic component can be, for example, organosiloxane, organosilane, primary or secondary higher-aliphatic alcohol, long chain amine, etc. In a preferred embodiment, the composition includes silicon as $SiO_2$ in an amount of between about ("about" in this case meaning slightly below these percentages because of the presence of the organosiloxane component therein) 60 and 99 wt. % and zirconium as $ZrO_2$ in an amount of between about 1 and 40 wt. %.

In accordance with a preferred embodiment of the hydrophobic compositions of the present invention, the organosiloxane component comprises a polydialkylsiloxane, such as polydimethylsiloxane, an in another embodiment, the organosiloxane can be a monosiloxane, such as monomethylsiloxane and methyltrichlorosiloxane. In the preferred embodiment, when polydialkylsiloxanes are employed, they are hydroxy-terminated, but it is also possible to use other reactive siloxanes. In addition, a combination of poly- and monosiloxanes can be utilized. In another embodiment, the average particle size of this composition is between about 1 and 5 microns.

In accordance with another embodiment of the present invention, a method is provided for producing a stabilized hydrophobic zirconium silica hydrogel which comprises providing a hydrophilic zirconium hydrogel including at least about 5 wt. % water bound as a hydrate and reacting the hydrophilic zirconium silica hydrogel with a hydrophobic component in order to bind the hydrophobic component to the surface of the hydrogel, thereby rendering the zirconium silica hydrogel hydrophobic, with the zirconium being present in an amount sufficient to improve the stability of the hydrogel, again preferably in amounts of between about 1 and 40 wt. % of the overall hydrogel, preferably between about 1 and 10 wt. %, and most preferably between about 2 and 7 wt. % thereof. In a preferred embodiment of this method, the hydrophilic zirconium silica hydrogel is milled to an average particle size of between about 1 and 5 microns prior to the reacting step.

In accordance with one embodiment of the method of the present invention, the providing step includes precipitating an alkali metal silicate in the presence of a zirconium compound, such as a zirconium salt, in an aqueous medium so as to produce the hydrophilic zirconium silica hydrogel therefrom. The alkali metal silicate preferably comprises sodium silicate, and the pH of the hydrogel as formed is preferably between about 10 and 12, and is then neutralized to a pH of between about 6.8 and 7.8 by the addition of acid thereto.

In accordance with another embodiment of this method of the present invention, the providing step includes reacting zircon with an alkali metal compound at elevated temperatures, or at elevated temperatures and pressures, so as to produce a soluble zirconyl silicate, and then precipitating the zirconium silica hydrogel from the soluble zirconyl silicate at a predetermined pH, which is preferably between about 10 and 12, which is again preferably reduced to about 6.8 to 7.8. In a preferred embodiment, the elevated temperatures comprise temperatures of between about 800 and 1200° C., while in another embodiment elevated temperatures of from 100 to 150° C. in conjunction with elevated pressures of from 100 to 500 psi are utilized.

In accordance with yet another embodiment of the method of the present invention, the method for providing a stabilized hydrophobic silica-containing hydrogel comprises providing a silica-containing compound including surface silanol groups, and contacting the silica-containing compound with a zirconium compound, such as the zirconium salts discussed above, and a hydrophobic component, again such as those discussed above, so as to bind both zirconium and the hydrophobic component to the surface of the silica-containing compound, the zirconium being present in an amount sufficient to stabilize the silica-containing compound. It is again preferred that the zirconium be present in a amount of between about 1 and 40 wt. % of the overall composition.

DETAILED DESCRIPTION

The present invention may be more fully appreciated with reference to the following detailed description.

There are a wide variety of conventional hydrophilic silica compounds currently available and in wide use, and these include the highly successful commercial colloidal silica products currently used extensively in a variety of industries. These compounds generally include a surface configuration as follows:

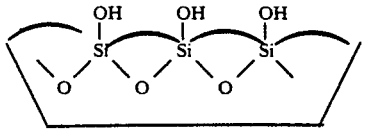

However, there are a number of forms of hydrophilic silica-containing compounds can find application in accordance with the present invention, i.e., which can be stabilized by the incorporation therein of zirconium in accordance with one of the techniques disclosed herein. This can include incorporation of the zirconium into the structure of the silica or silicate-containing compound during the formation thereof, in which case a significant amount of the zirconium becomes distributed within the silica or silicate-containing compound and is therefore unavailable for bonding at the surface thereof. As discussed below, this technique is preferably applied to the formation of zirconium silica hydrogels in accordance herewith. However, it can also include the addition of zirconium primarily to the surface of the previously formed silica or silicate-containing composition, in which case substantially all of the zirconium becomes bound to the surface of the silica or silicate-containing composition. Again, in each of these cases the hydrophilic zirconium and silica or silicate-containing compounds are unexpectedly stabilized as compared to the prior art silica or silicate-containing compositions.

Bearing this in mind, there are several known forms of hydrophilic silica or silicate-containing compositions to which these techniques of the present invention can be applied. These hydrophilic materials can thus be one of the conventional particulate, porous or agglomerated silicas or silicates containing at least about 60 wt. % $SiO_2$ as silica or silicate, thus insuring the presence of surface hydroxyl or silanol groups.

The silicas and silicates useful in this invention are generally characterized by either a porous or agglomerated particulate structure having an extraordinarily large surface area per unit weight. In the past, there have been a number of ways to obtain a hydrophilic siliceous starting material which can provide such high surface areas, which are particularly desirable where, for example, these hydrophilic materials are to be used to provide a hydrophobic compound. One such way is to select a siliceous particulate material which has an extremely small "ultimate" particle size. These very tiny particles, typically colloidal in size, tend to form agglomerates which are typically larger than the "ultimate" particles by from about one to about four orders of magnitude, typically by at least two orders of magnitude.

Another way of obtaining this high surface area is to select an expanded mineral such as perlite. Non-agglomerated perlite particles are available in much larger particle sizes as compared to, for example, precipitated silica. Because it is an expanded rock, the perlite nevertheless provides a large amount of surface area.

When the hydrophilic siliceous starting material is an expanded particulate rock such as perlite, the particle size of this starting material will generally be within the range of 1–1,000 micrometers, preferably less than 100 micrometers. If the particulate starting material is an agglomerate, the average size of the agglomerated particles will typically be within the range of 0.1–100 micrometers, preferably less than 20 micrometers. These rather small agglomerates are made up of still finer particles, typically ranging in average particle size from 0.005 to 0.050 micrometers.

As noted above, it is essential that these siliceous materials include surface silanol groups, for the reasons discussed below. Thus, if a substantial portion of the hydrophilic mineral is not silica, this will of course reduce the level of available silanol groups. The mineral bentonite has been disclosed as a starting material for a hydrophobic silicate. Bentonite is a montmorillonite and can be considered to contain MgO, CaO, and $Al_2O_3$ in addition to $SiO_2$. In addition, the hydrous form of this mineral contains water of hydration. There is (at least after dehydration) a major amount of $SiO_2$ in this mineral. Similarly, perlite is reported to contain 10–20% $Al_2O_3$, 2–5% water, and 65–75% $SiO_2$. Vermiculite, another mineral capable of being expanded in a manner analogous to perlite, is reported to contain more than 40 mole percent of $SiO_2$, even if the presence of water of hydration is taken into account.

The preferred hydrophilic siliceous starting material is precipitated silica, a relatively pure form of silica containing more than 95 wt. % $SiO_2$. Other forms of finely divided silica are operative in the invention, albeit with less effectiveness than precipitated silica.

Synthetic amorphous silicas are manufactured in various ways. "Aerogel" silicas are obtained by forming a silica hydrogel by polymerization of an alkali metal silicate solution and then washing the hydrogel by means which avoid shrinkage of the gel, e.g. by the steam micronizing process. The aerogel product generally has a pore diameter in excess of about 10 nanometers and a surface area in excess of about 200 $m^2/g$, although typically not much larger than 350 $m^2/g$. The particles of aerogel are agglomerates typically averaging less than 10 micrometers in size. The "ultimate" particles which make up these agglomerates are usually colloidal in size and are smaller than the agglomerates by at least one and in many cases two or three orders of magnitude.

Typical examples of silica aerogels include "SYLOID 244FP" and "SYLOID 266FP" (trademarks of W. R. Grace & Co.), each of which is characterized by a surface area of 310 $m^2/g$ and an average particle size in the range of 2 to 3 micrometers. These commercially available aerogel silicas contain in excess of 99% $SiO_2$ and less than 0.1% each of alumina, titania, calcium oxide, sodium oxide, magnesium oxide, other oxides, and metals or metalloids. The amorphous nature of both the aerogels and the xerogels has been established by X-ray studies, electron micrographs, and the like. The particles of these silica gels have substantial surface hydroxylation.

The process for making a silica xerogel is similar to that for the aerogel, except that the initial hydrogel is slowly washed and dried, typically at a pH near 4. During the slow washing and drying step, a strong shrinkage of the network-like hydrogel structure occurs, resulting in a smaller average pore diameter and a larger surface area. The surface area of "SYLOID 63FP" (trademark of W. R. Grace & Co.), for example, is reported to be 675 $m^2/g$. The average particle size of xerogel agglomerates may be slightly larger than in the case of the aerogels, but is still about the same order of magnitude, e.g. approaching 10micrometers. The "ultimate" particle size is also similar to that of the aerogels.

"Fumed" silica is normally made by hydrolyzing silicon tetrahalide vapor in a flame of hydrogen and oxygen, producing smoke which consists essentially of colloidal silica particles. The "ultimate" size of these particles is normally even smaller than in the case of precipitated, aerogel, and xerogel silicas, but fumed silica is also capable of agglomeration. In the combustion/hydrolysis process, molten spheres of silica are formed. The diameters of the silica spheres tend to run about 5 to about 15 nanometers in diameter. These molten spheres collide and fuse with one another to form branched, three-dimensional, chain-like aggregates. As the aggregates cool below the fusion temperature of silica, further collisions result in some reversible mechanical entanglement or agglomeration. Further agglomeration can also take place during the collection of these agglomerated particles. The surface area of fumed silica is comparable to the precipitated and gel forms of silica and can exceed 300 $m^2/g$. The fumed agglomerates have one disadvantage, however: there is generally less surface hydroxylation as compared to precipitated silica.

"Precipitated" silica is prepared by destabilization of water-soluble silica (e.g. an alkali metal silicate) under conditions that do not permit formation of a gel structure, but rather cause the flocculation of silica particles into coherent aggregates. Both "ultimate" and agglomerate particle sizes of precipitated silica ar similar to other forms of silica such as the aerogels. For example, "ultimate" particle sizes can range from about 5 to about 50 nanometers, the average "ultimate" particle size typically being well below 50 nanometers, e.g. 230 nanometers or less. The surface area of precipitated silicas normally exceeds 200 $m^2/g$ and may approach 400 $m^2/g$ or more. The chemical composition of the agglomerates comprises high purity $SiO_2$, typically above 95% silica. As noted previously, the surface hydroxyl content is high and will normally exceed one OH per nm.

One commercially available form of precipitated silica is sold under the trademark "QUSO." (Philadelphia Quartz Company of Philadelphia, Pa.). These precipitated silicas sold under the "QUSO" mark have various additional designations such as G30, G32, F22, F20, H40, etc.

There are a number of commercially available "QUSO" silicas which differ in their thickening effect upon aqueous and nonaqueous media. These differences in viscosity-increasing effects are not critical in the context of this invention, since many of these available precipitated silicas are reported to have high surface areas, low free moisture content, and a high density of surface hydroxyl groups per square nanometer.

An example of a suitable precipitated silica is "QUSO G30" (trademark of Philadelphia Quartz Company). This precipitated silica has been used to make hydrophobic silica; see, for example, U.S. Pat. No. 4,123,383 (Ihde), issued october 31, 1978. Hydrophilic "QUSO G30" silica is reported to have a pH of 8.5, a surface area of 300 $m^2/g$, and, like other "QUSO" silicas, a fully hydroxylated surface (about 8 hydroxyls per square nanometer) and an average "ultimate" particle size of 12 nanometers. It is said to contain more than 97% $SiO_2$ on a dry basis.

The agglomerates formed by precipitated silica particles can be subdivided, e.g. through the use of a colloid mill or other forms of milling. If the agglomerates were ever broken down to the "ultimate" particle size of the precipitated silica particles, the particles would be in the colloidal range, e.g. about 5 to about 50 nanometers in average diameter. However, this degree of subdivision is neither necessary nor desirable; a high degree of agglomeration helps to provide the high surface area and porosity characteristics of the material.

In accordance with the present invention, however, a zirconium compound is utilized to produce the zirconium silica hydrogels of the present invention, preferably in a substantially pure form. As is mentioned above, the integration of zirconium into the structure of these siliceous materials, such as the hydrogels discussed herein, provides the novel compounds of this invention. It has thus been found that the presence of zirconium adds significantly to many of the most desirable properties of these compounds in the commercial environments where they are most widely utilized. Not only do these hydrophilic zirconium and silica or silicate-containing compounds and hydrogels thus have higher surface areas, and thus more available reactive sites, but they are stabilized by the presence of the zirconium, and are capable of cross-linking with other materials and of producing more stable hydrophobic compositions when hydrophobic constituents are linked to their surface, which is believed to be accomplished through silanolate and zirconolate linkages thereto. It is thus postulated that the domination by polynuclear hydroxy species in the aqueous solution chemistry of zirconium is an important factor in these results. Zirconium thus exhibits an ability to create strong bonds, as a result of ion pairings or covalent bonding, to various organic polymers. It is thus not only possible to produce unexpectedly stabilized compounds in which the zirconium and silica or silicate-containing compounds of this invention are bound to hydrophobic species, but also where they are cross-linked to various other non-hydrophobic organic components, such as with various resins used in paint compositions and the like. In particular, it is thus possible to bind these compounds in this manner to such organic constituents as various amines, carbonates, sulphates, acetates, and the like.

In any event, in a highly preferred embodiment hereof, zirconium silica hydrogels are produced in accordance with this invention by methods which eventually include a precipitation step. In one method an alkali metal silicate is precipitated in the presence of a zirconium compound in an aqueous medium. Thus, the presence of the zirconium compound, where a zirconium salt is utilized in the aqueous medium during precipitation, results, in effect, in a co-precipitate being formed of both zirconium and silica, thus resulting in the desired hydrogel. Such precipitation will generally occur under basic pH conditions, i.e., at a pH of between about 10 and 12. It is then preferable to adjust the pH so as to neutralize the hydrogel, e.g., to lower the pH to between about 6.8 and 7.8. Various zirconium salts can be used and, in fact, appropriate selection of certain of these salts, in an aqueous medium, will in and of itself result in a decrease in the pH of the solution, and thus assist in the precipitation process itself. If not, however, the desired pH can be achieved by addition of acid to the aqueous medium, preferably a mineral acid or an organic acid. The various zirconium salts which can be used can include such salts as zirconium sulfate, zirconium hydrochloride, zirconium carbonate, zirconium nitrate, zirconium carbonate, zirconium acetate, zirconium chloride, zirconium oxychloride, zirconium hydroxychloride, and other such salts. By using salts such as zirconium chloride or oxychloride, the pH of the solution will be inherently decreased, thus assisting in the precipitation process.

Various alkali metal silicates can be employee, but the most common and preferable alkali metal silicate which can be so used would be sodium silicate. Furthermore, in order to produce the desired pH level, the acids which can be used would preferably comprise various mineral acids, such as sulfuric, nitric, hydrochloric, phosphoric, and various organic acids, such as acetic acid, etc. Other than their ability to produce the desired pH, these acids are selected based on whether or not their salts can ultimately be removed by washing, burning or other such commercially economical means.

The alkali metal silicate or sodium silicate can itself be used as a starting material for the preparation of these hydrogels, or it can, in turn, be produced in a conventional manner. In particular, these silicates are generally produced by reacting silicon dioxide with an alkali metal compound under the desired conditions. The silicon dioxide can itself be provided from various sources, such as natural quartz, diatomaceous earth, flint, or other such sources. The alkali metal compound can include an alkali metal hydroxide, carbonate or the like, such as sodium hydroxide, sodium carbonate, potassium hydroxide, potassium carbonate, etc.

Another method for manufacturing zirconium silica hydrogel in accordance with this invention includes reacting zircon ($ZrSiO_4$ or $ZrO_2 \cdot SiO_2$) with an alkali metal compound at elevated pressures and temperatures to produce a soluble zirconyl silicate. This reaction can thus be represented as follows:

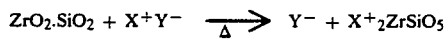

in which X comprises an alkali metal, such as sodium, potassium, etc. and Y comprises an appropriate anion, such as OH—, $CO_3$—, etc. This reaction can be conducted at highly elevated temperatures of between about 800 and 1,200° C., preferably 1,000 to 1,200° C., in a furnace, or it can be conducted in a pressurized reactor at temperatures of from about 100 to 150° C. and at pressures of from about 100 to 500 psi. Thus, where $X^+Y^-$ comprises a compound such as $Na_2CO_3$, $Y^-$ is removed as carbon dioxide, and the sodium zirconyl silicate ($Na_2ZrSiO_5$) is thus produced.

This soluble zirconyl silicate compound can then be used to produce the zirconium silica hydrogels of the present invention by precipitation, such that the presence of the aqueous solution of this silicate material at an appropriate pH, preferably between about 6.8 and 7.8, which can again be attained by the presence of an acid, leads to the production of the hydrogel compositions of this invention.

By any of the above routes, precipitation in the aqueous medium results in the production of the zirconium silica hydrogel, which generally has the following surface configuration:

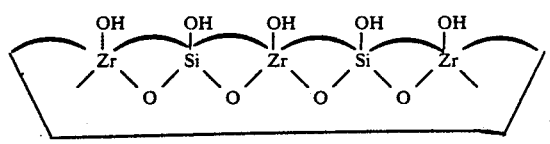

which can also be represented as:

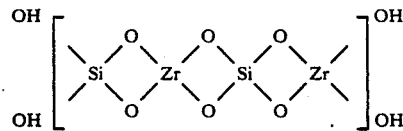

Actually, while these representations show alternating silicon and zirconium atoms, this is not the case. Thus, the product itself actually comprises a stoichiometric blend of these co-precipitated materials in which, in the overall composition, the substantially pure hydrogel includes silicon as $SiO_2$ in amounts of between about 60 and 99 wt. % of the hydrogel, preferably between about 90 and 99 wt. % of the hydrogel, and most preferably between about 93 and 98 wt. % of the hydrogel, and zirconium as $ZrO_2$ in an amount of between about 1 and 40 wt. % of the hydrogel, preferably between about 1 and 10 wt. % of the hydrogel, and most preferably between about 2 and 7 wt. % of the hydrogel. The hydrogel also includes at least about 5 wt. % water bound as a hydrate, and generally between about 5 and 10 wt. % water bound as a hydrate. Furthermore, substantially all of the zirconium used in the manufacturing procedure is bound to the hydrogel structure, which is substantially free of excess zirconium.

The compound itself generally exists as a hydrogel in that it is a hydrate with between 5 and 10 wt. % water bound as zirconol-silanol groups, and preferably between about 6 and 8 wt. % water bound in that manner, and as much as 40 wt. % additional water physically bound to the compound, generally between about 10 and 15 wt. % additional water, and preferably between about 5 and 8 wt. % additional water.

In another embodiment hereof, as noted above, one of the various forms of hydrophilic silica or silicate-containing compounds discussed above, such as silica hydrogels, precipitated silica, perlite, diatomaceous earth, etc., can be used as a starting material to provide a hydrophilic zirconium and silica or silicate-containing compound having unexpectedly improved stability. In accordance with this method the particular source of silica is combined with a zirconium compound, such as zirconium oxide, but preferably a zirconium salt, such as zirconium chloride, zirconium oxychloride, zirconium hydroxychloride, zirconium sulfate, zirconium orthosulfate, zirconium carbonate, zirconium nitrate, and zirconium acetate. This contacting step includes intimately blending these components, either in a dry blended form, in an aqueous medium, or in the presence of non-polar solvent, such as kerosene, mineral oil, etc. The mixture is then reacted at temperature of from about 100 to 400° C., and preferably from about 150 to 200° C. to form the stabilized hydrophilic zirconium and silica or silicate-containing compounds hereof.

While not being held to any particular theory, it is believed that the increased stability and performance of these zirconium stabilized silica compounds is due to the presence of zirconol groups available for bonding at the surface of these silica compounds. More specifically, the silica compound set forth below can react with hydrophobic compounds, such as the organosiloxanes, for example, at the —OH sites through a condensation or dehydration-type reaction.

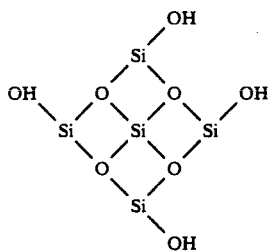

In this case Si—O—Si bonds are then formed with the organosiloxane component at the surface of the silica compound. Zirconium is a quadravalent material and readily forms polymers in aqueous media. The zirconium stabilized silica compound is thus believed to form a surface configuration which can be represented as follows:

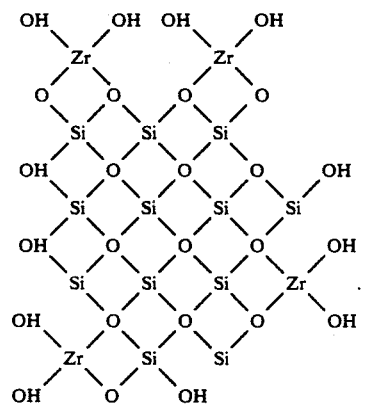

The presence of the zirconium thus not only increases the OH-surface density, thus increasing the reactive sites, but it also provides for the presence of the stronger zirconolate linkages in either cross-linked or hydrophobized products thereof, for example. These hydrophobic products will thus exhibit these characteristics in terms of improved resistance to wettability, such as methanol wettability, increased stability in alkaline systems, and at higher temperature in in-use conditions.

These hydrophilic zirconium and silica or silicate-containing compositions have a wide variety of uses. While they can thus, in essence, be substituted for silica gels, etc. (see infra), precipitated silicas, and the other forms of silica discussed above, where they were previously used in various compositions, they exhibit improved results when used in various of these environments. For example, these hydrophilic zirconium and silica or silicate-containing compositions can be cross-linked to various organic resinous materials, which may or may not be hydrophobic. As discussed above, they can thus be cross-linked to various resins, such as those present in paint compositions and the like, and thus form unexpectedly stabilized cross-linked polymeric compositions. As an example of same, they can be cross-linked to various carboxylic acid groups to produce such compounds.

In accordance with another aspect of the present invention, a hydrophobic silica-containing composition has been produced from the above-described hydrophilic zirconium and silica or silicate-containing compounds and/or hydrogels. In the case of the prepared zirconium silica hydrogels discussed above, this is generally accomplished by initially drying an milling these zirconium silica hydrogels. The drying process is carried out at temperatures between about 125 and 650° C., and preferably between about 425 and 550° C., and the milling process is conducted so as to produce a particle size product of between about 1 and 30 microns, preferably between about 3 and 10 microns, and most preferably below about 5 microns. The zirconium silica hydrogel is then surface treated with a hydrophobizing agent. A number of these compounds are known for rendering conventional silica hydrogels hydrophobic. In each such case this is believed to be accomplished by a dehydration or condensation reaction in which it is theorized that silanolate and zirconolate linkages are produced. More particularly, and depending upon the particular hydrophobic constituent which is so used, it is believed that the silanol (—Si—OH) and zirconol (—Zr—OH) groups located on the surface of the hydrogel are converted respectively into a silanolate (—Si—O—) and a zirconolate (—Zr—O—) linkage. A number of hydrophobizing agents are known, and they include the organosiloxanes, organosilanes, primary and secondary higher-aliphatic alcohols, long chain amines, etc. In each of these cases it is theorized that the silanolate and zirconolate linkages will therefore attach to silicon atoms (—Si—O—Si— and Zr—O—Si—) in the case of the organosiloxanes and organosilanes; to carbon atoms (—Si—O—C— and —Zr—O—C—) in the case of the primary and secondary higher aliphatic alcohols; and to nitrogen atoms (—Si—O—N— and —Zr—O—N—) in the case of the long chain amines. In each case, however, the presence of the zirconium atoms in the hydrogel results in a hydrophobic product having important improved stability, which can improve a variety of the physical characteristics of these materials in a number of their commercial environments.

On the other hand, in the case of the above embodiments in which the silica or silicate-containing compound is surface treated with a zirconium compound, it is possible to include the hydrophobic material along with the zirconium compound. Thus, the hydrophobic compound is included along with, or added subsequent to, the source of silica and the zirconium compound, and where included therewith these three components are intimately blended together, again in either a dry blended form, in an aqueous medium, or with a non-polar solvent. The mixture can then be reacted at a temperature of from about 100 to 400° C., preferably from about 150 to 200° C., to, in this case, form a zirconium-stabilized hydrophobic silica.

As for the hydrophobic component itself, where a silicone oil or organosiloxane is utilized, the dry, finely divided silica or silicate-containing compound or hydrogel is treated with a silicone oil, such as by spraying the silica particles with the silicone oil, and then heating at elevated temperatures of from about 200 and 600° C., preferably from about 200 and 250° C., for a period of from 2 to 4 hours, preferably from about 2 to 3 hours. The amount of silicone oil sprayed on the particles may vary over wide ranges, preferably 17% up to about 40 or 50% by weight based on the weight of the silica. However, amounts from about 10 to 40% by weight, or preferably 20 to 30% by weight are usually satisfactory and preferred herein.

The silicone oil itself may be a an organosiloxane, such as a mono- or polysiloxane oil, such as alkyl, aryl, alicyclic or arylalkylsiloxane, or a polysiloxane having a viscosity of from about 300 to about 1,000 centistokes at 25° C. Preferred silicone oils include alkylmono- or alkylpolysiloxanes having viscosities of from about 300 to about 500 centistokes at 25° C. These organosiloxanes include dimethylpolysiloxane, diethylpolysiloxane, dipropylpolysiloxane, methylethyl-polysiloxane, dioctylpolysiloxane, diethylpolysiloxane, methylpropylpolysiloxane, dibutylpolysiloxane, didodecylpolysiloxane, monomethylsiloxane and methylchlorosiloxane.

Another hydrophobizing agent for use in this invention is a prepolycondensed organohalosilane, or a mixture of organohalosilanes, and especially prepolycondensed dimethyl-dichlorosilane and methyltrlchlorosilane.

In general, the dichloro- and trichloroorganosilanes employed in the present invention are represented by the following formulae:

wherein R and R' may be alkyl or alkenyl, aryl, and alkaryl, such as methyl, ethyl, vinyl, propyl, decyl, dodecyl, heptadecyl, octadecyl, and the like, and may be straight or branched chain, cyclohexyl, phenyl, benzyl, and the like, and may be the same or different. Many of these chlorinated organosilanes may be purchased as staple items. In the present system commercially available dimethyldichlorosilane and methylvinyl dichlorosilane are the preferred dichlorosilanes, and $C_8-C_{20}$ trichlorosilanes, particularly methyl stearyl trichlorosilane and octadecyl trichlorosilane are preferred. When the organo moiety is represented by an unsaturated hydrocarbon, such as with methylvinyl dichlorosilane, it may be further halogenated or sulfated after reaction with the zirconium silica hydrogels of this invention. Halogenation may be accomplished by utilizing the HCl generated during the reaction, under pressure, as known in the art, and sulfation may be accomplished by adding $H_2SO_4$.

In practicing the present invention about 1-15% of the hydrophilic zirconium and silica or silicate-containing compound, such as a precipitated hydrophilic zirconium silica hydrogel is converted to a hydrophobic silica by first dispersing in an inert water-immiscible liquid, such as naphthenic or paraffinic mineral oil, kerosene, hexane, heptane, and the like. A quantity of trichloro-organosilane, in the range of 10-50% based on the hydrogel, is then added to the suspension, followed by a quantity of the dichloro-organosilane, in the range of 10-50% based on the hydrogel in a molar proportion of about 1:1 to 1:5 respectively, keeping the temperature below about 50° C., and preferably below 40° C., during the additions so not to drive off the volatile chloroorganosilanes. Quantities of dichlorosilane much below 1 mol, based on the trichlorosilane, and more than 5 mols, produce unacceptable defoamers and are not part of the present invention. Ideally the amount of dichlorosilane employed, as stated above, is in the range of 2-4 mols, based on the trichloro-organosilane content. A molar proportion of 1:3 is the most preferred proportion. Alternatively, the hydrogel may be added to the inert liquid carrier containing the trichloroorganosilane, and then the dichlorosilane is added, with similar results.

The reaction is usually completed in about 0.5-4.0 hours, mainly depending on the batch size. After completion, the reacted mixture is heated to about 100°-120° C. for a period of time to expel the HCl gas generated during the reaction.

Yet another hydrophobizing agent for use in this invention is a primary or secondary higher aliphatic alcohol. Such straight- and branched-chain higher aliphatic primary and secondary alcohols are among the most readily available hydrophobic alcohol starting materials which can be used in this invention. Alcohols containing 20 or more carbon atoms are of particular interest, since they are a by-product of synthetic alcohol manufacture; they are normally considered less desirable than the $C_8-C_{18}$ alcohols at reasonable prices, particularly as compared to more highly sophisticated hydrophobic materials, such as the polysiloxanes. In the context of this invention, it has been found that there is no apparent disadvantage to the $C_{20}$ (or higher) alcohols as compared to their supposedly more desirable lower analogs.

Lower aliphatic alcohols generally lack sufficient hydrophobic character to be used in this invention. For example, 1-hexanol is slightly soluble in water, and hexylene glycol is even more water soluble. Even 1-heptanol and 2-heptanol have some hydrophilic character. The octanols, in and of themselves, have been used successfully to provide some defoaming effects, as have the $C_{10}$ to $C_{18}$ alcohols. With respect to the $C_{20}$ and higher alcohols, commercially available "$C_{20}$" and "$C_{22}$" alcohols are often mixtures containing $C_{24}$, $C_{26}$, $C_{28}$, and still higher alcohol species, the $C_{30}$ and higher alcohols being present in the alcohol mixture in very minor amounts (e.g. less than 10% by weight). Availability may diminish above $C_{30}$, but higher alcohols (e.g. $C_{36}$, $C_{40}$, etc.) are known.

Although both branched-chain and linear aliphatic alcohols are commercially available, the linear or straight-chain type appear to provide a better technical performance with substantially no accompanying economic disadvantage. The saturated aliphatic alcohols (the alkanols) and the aliphatic alcohols of low unsaturation (e.g. up to three double bonds per molecule) generally offer economic advantages and are very effective from a technical standpoint. Primary alcohols are preferred for ease of reactivity; however, the secondary alcohols are by no means inert toward the surface hydroxylated materials of this invention.

Long-chain, linear secondary alcohols are known, an example being TERGITOL 15-S (trademark of Union Carbide Corporation). The linear secondary alcohols are said to be prepared from linear paraffins and separated by a molecular sieve process from the kerosene fraction of petroleum.

In short, the most preferred substantially hydrophobic alcohols have at least 8 carbon atoms; are generally saturated compounds, typically monomeric in structure (i.e. free of repeating units other than —CR2—, wherein R is hydrogen or alkyl); and typically contain a secondary or, more preferably, a primary OH.

Hydrophobic alcohols used in this invention appear to have the ability to form hydrogen bonds or otherwise enter to reactions with surface-hydroxylation at normal ambient temperatures and relatively modest temperatures ranging up to about 100° or 110° C.

In the case of these alcohols, the hydrophilic zirconium silica hydrogels hereof are converted into the substantially hydrophobic zirconium silica hydrogels hereof by heating a mixture of the hydrophilic material with a suitable substantially hydrophobic alcohol. The mixture is heated to a temperature above 100° C., and preferably to at least 150° C. As in most chemical reactions, there is an interdependency between reaction time and temperature. At 250° C., reaction times are very short, and this can be convenient for large volume manufacture. At 150° C., reaction times are typically much longer and may be as much as 3 or 4 hours or more. It is generally advisable to maintain the elevated temperature conditions for at least 30 minutes and preferably for at least one hour, even at temperatures above 150° C. Reactor design for temperatures in the range of 150°-200° C. is relatively simple, and this equipment factor can help to compensate for relatively longer reaction times. At 190°-210° C., a reaction time of 4 hours is generally sufficient, but longer times are not precluded.

At temperatures above 100° C., most of the preferred hydrophobic alcohols used in this invention are in a liquid state. The hydrophilic zirconium silica hydrogel can theoretically form a heterogeneous reaction system with the liquid alcohol, provided the ratio of siliceous solid to liquid or molten alcohol is sufficiently low. The preferred ratios, however, are generally in excess of 1:4 (5:1 or more), and it is desirable, if not essential, that the liquid carrier medium be present during the chemical reaction which forms the hydrophobic compound.

The result of these reactions with a hydrophobic component is to bind the hydrophobic component to the surface of the hydrophilic zirconium and silica or silicate-containing material or hydrogel by silanolate and zirconolate bonds, thus rendering the zirconium silica hydrogel hydrophobic. The hydrophobic composition thus produced will include silicon as $SiO_2$ in an amount of between about 60 and 99 wt. %, preferably between about 90 and 99 wt. % of the overall composition, and most preferably between about 93 and 98 wt. % of the overall composition, and zirconium as $ZrO_2$ in the amount of between about 1 and 40 wt. %, preferably between about 1 and 10 wt. % of the overall composition, and most preferably between about 2 and 7 wt. % of the overall composition.

The various zirconium and silica compounds and hydrogels of this invention are highly useful in a number of commercial areas. In general, they can be substituted for conventional silica gels or silicates which are presently used quite widely in various fields, both in the hydrophilic and hydrophobic forms. In many of these cases they exhibit demonstrably superior properties when so utilized. These uses can include use as commercial defoaming and anti-foaming agents, as well as additives in paint compositions, in rubber compositions, as bleaching or polishing agents for the removal of high molecular weight constituents from edible oils, as anti-caking agents, etc.

One of the most important of these uses is as a defoaming and/or anti-foaming agent. This can include, for example use in defoaming applications relating to the manufacture of waterlaid sheets, treatment of waste or recyclable liquors, and treatment of other aqueous systems which tend to trap air or form foam. Examples of specific uses include controlling foam in black liquor, in white liquor, in food processing (e.g. beet sugar refining operations), in waste treatment (as in sewage plants), in re-pulping and/or deinking of recyclable paper or other waterlaid sheets, and in treating sulfite liquors.

In the re-pulping of old newspapers, magazines, and other recyclable paper typically having printed matter on it, the recyclable paper is beaten and cooked with an alkaline agent and a surfactant. The ethoxylates of phenolic compounds or other hydrophobic "tails" or capping groups for the oxyethylene chain are typical of the nonionic surface active agents used in a re-pulping process. The deinking and re-pulping are typical of uses of the compositions of this invention in at least one respect: the re-pulping or deinking medium is typically at a moderately elevated temperature approaching the boiling point of water, e.g. above 30° C., more typically 50°-80° C. During re-pulping, the object is to remove the inks, wet strength resins, clay, and other agents originally added to the paper and thereby salvage a useful pulp. The raw material for this process is sometimes referred to in the paper industry as "broke."

After cooking, the pulp is separated from the liquor on the screen. This pulp is "washed" as necessary, usually three to five times, with water by resuspending the pulp and draining on the screen for each wash. These steps help to remove soluble as well as insoluble residues from the pulp. During the washing and draining operation, air bubbles from the use of surfactants during the re-pulping or deinking process get trapped in the pulp and hinder the draining of the "wash water." Typically, no additive is included in the "wash water." By adding a defoamer to this "wash water," the bubbles are made to collapse and increase the efficiency of the wash process, particularly the draining steps. With less retention of water through the use of a defoamer, less dissolved solids as well as suspended solids are retained by the pulp.

Other applications of compositions of this invention include the use of defoamers in industrial water curtain-type paint booths, as defoamers in latex paints, and the like. Defoamers and deaerating compositions of this invention do not appear to have a tendency to form heavy particulate resides or deposit build-up in systems such as deinked and re-pulped recyclable paper.

The technique for using a defoaming composition of this invention is ordinarily very simple and generally in accord with prior art practices for treating foaming aqueous systems such as black liquor. A relatively small amount of the defoaming composition can be added directly to the black liquor or other aqueous system. Typically, far less than 1% by weight will be required for significant defoaming, amounts less than 0.1% by weight being typical, even if one includes the weight of the aqueous carrier liquid as part of the defoaming system. (Typically, the hydrophobic silica or silicate, when dispersed or otherwise distributed through a liquid hydrocarbon carrier, constitutes only a minor amount of the total defoaming composition, most typically about 1-30% by weight of the system.)

A typical defoaming composition ordinarily comprises from about 70 to 97% of a water insoluble organic liquid selected from the group consisting of kerosene, naphthenic mineral oil, paraffinic mineral oil, chlorinated naphthenic mineral oil, chlorinated paraffinic mineral and liquid difluorovinyl chloride polymer.

The liquid aliphatic, alicyclic, or aromatic hydrocarbons suitable for use herein are liquids at room temperature and atmospheric pressure and have a viscosity of about 30 SUS to 400 SUS at 370° C. and a minimum boiling point of at least 65° C. and contain 6 to 25 carbon atoms.

Hydrocarbons such as benzene, hexane, heptane, octane, mineral seal oil, naphtha, naphthenic mineral oil, paraffinic oil and mineral oil, etc. are examples of some of the compounds which have been found suitable for use as the liquid hydrocarbon component. Of course, mixtures of two or more of these or similar hydrocarbons may be employed. From about 3% to about 30% of finely divided hydrophobic zirconium silica hydrogel is suspended in the organic liquid. The mixture is thixotropic. The structure may be broken by homogenization or heating, or ultrasonic mixing or similar devices. These compositions may be used in such a form or may be emulsified. While we prefer to employ these defoaming compositions as dispersions in hydrocarbons, they are also useful when prepared as emulsions as shown in the prior art.

These defoamers ar especially adapted to defoam aqueous systems which contain foam-producing solids such as latex glues, resinous materials, starches, etc. The defoaming compositions are used in amounts of from 0.01% to about 0.5% by weight of the dry foam-producing solids in the aqueous system. Alternatively the said defoaming composition is added in a small amount of at least 1 p.p.m. and from about 0.003 to about 0.5% to the aqueous system in which it is desired to prevent foaming.

In connection with the preparation of paint compositions, it has been found that the zirconium silica hydrogels of the present invention show far superior results as compared to the precipitated silicas previously employed therein. Thus, typical paint compositions include between about 3 and 15 wt. % of the zirconium silica hydrogels of the present invention, preferably between about 6 and wt. %.

By utilizing the zirconium and silica or silicate-containing compounds and hydrogels of the present invention in this environment, it has thus been unexpectedly found that the abrasion resistance, corrosion resistance, weathering characteristics, etc. for these paint compositions have been surprisingly improved upon.

Another important use of the hydrophilic compounds of the present invention has been found to be as an additive for rubber compositions. Thus, such compositions will generally include between about 7 and 30 wt. % of the zirconium silica hydrogel, generally as a titanium dioxide extender in elastomers such as styrene butadiene rubber, natural rubber, etc.

It has also been found that the hydrophilic compounds of the present invention can be employed as bleaching or polishing agents in connection with the filtering of edible oils. Thus, in these formulations, the zirconium silica hydrogels hereof, when used in amounts of between about 2 and 3 wt. % exhibit important fatty acid and high molecular weight material removal.

The compounds of the present invention have also found to be useful in connection with anti-caking usage, and in such formulations, generally including between about 0.1 and 3 wt. % of the zirconium silica hydrogel of the present invention, preferably between about 0.5 and 1 wt. % thereof.

EXAMPLE 1

The superiority of the hydrophilic zirconium and silica or silicate-containing compounds of the present invention, as well as that of the hydrophobic forms of same, was demonstrated by comparative tests of these compounds of the present invention and the silica-containing compounds known in the art, as well as the byproduct of zirconium recovery processes discussed on page 4 of this specification.

Firstly, zirconium silica hydrogels in accordance with the present invention were produced by combining three parts $SiO_2$ as "D" grade sodium silicate produced by PQ Corp. of Valley Forge, Pa., with one part $ZrO_2$ in the form of zirconium oxychloride from Magnesium Elecktron Inc. of Flemington, N.J. In this manner, a gel was produced, and with mixing a slurry was produced having a pH of 11.5. This pH was higher than expected, and was reduced to 7.0 by the addition of hydrochloric acid, so as to prevent the redissolution of the silicon. The solids were then separated by filtration and washed with de-ionized water in order to remove salts therefrom. The resultant zirconium silica hydrogel was then dried at a temperature between about 100° C. and 300° C. so as to produce a fine, white powder which included between 5 and 8 wt. % water as a hydrate, and between 5 and 10% physically bound water. This material had an appearance similar to that of conventional silica hydrogels having a density of between about 0.2 and 0.3 g/ml. This material is referred to below as ZSH (zirconium silica hydrogel).

For comparative purposes, a sample of the byproduct of the zirconium recovery process, as discussed at page 4 of this specification, was obtained from Magnesium Elecktron Inc. This material had been produced by a process which included reaction of zircon with sodium carbonate at temperatures of between about 900 and 1,200° C., thus producing a frit or solid/semi-solid particle identified as sodium zirconyl silicate. An intense acid reaction was then carried out thereon in order to attempt to dissolve or disassociate as much zirconium as possible from the silica, thus leaving a precipitate of silica, zircon, various zirconium silica species, salts and other contaminants. In fact, the presence of unreacted zircon was confirmed by x-ray diffraction, which could be directly contrasted to the absence of such zircon or other contaminants in the ZSH product. This byproduct material was a tan to gray powder which included grit-like particles within fine particles, and which was similar in appearance to clays or other naturally impure materials having a density of from about 0.4 to 0.5 g/ml. This material is referred to below as ZPB (zirconium precipitate byproduct).

The ZSH and ZPB materials, as well as conventional silica gel, were each hydrophobized in order to directly compare their hydrophobicity or wetting ability. In addition, conventional silica gels were contacted with zirconium compounds as well as a hydrophobic component, again to compare the characteristics thereof. In particular, the following 16 samples were produced:

Sample No. 1 constituted ZPB to which was added 20% of a polydimethylsiloxane polymer sold under the designation DC Q1-3563 by Dow Corning Corporation, having a viscosity at 25° C. of 100 cst, 1.0% active silanol, a refractive index at 25° C. of 1.404, a specific gravity of 0.970, a flash point above 250° F., and a silicone content of 100%. The products in this case, and in each of these samples, were reacted at 200° C.

Sample No. 2 constituted ZPB to which was added 30% of DC Q1-3563.

Sample No. 3 constituted ZPB to which was added 40% of DC Q1-3563.

Sample No. 4 constituted a silica hydrogel designated LOVEL 275 (a registered trademark of PPG Industries) to which was added 20% of DC Q1-3563.

Sample No. 5 constituted LOVEL 275 to which was added 30% of DC Q1-3563.

Sample No. 6 constituted LOVEL 275 to which was added 40% of DC Q1-3563.

Sample No. 7 constituted LOVEL 275 to which was added 25% zirconium oxychloride, in the form of a solution provided by Magnesium Elektron Inc. which included the equivalent of 20% $ZrO_2$, and which was prepared at a nominal $HCl:ZrO_2$ molar ratio of 2:1, and of DC Q1-3563.

Sample No. 8 constituted LOVEL 275 to which was added 25% zirconium oxychloride and 20% DC Q1-3563.

Sample No. 9 constituted LOVEL 275 to which was added 15% zirconium oxychloride and 40% DC Q1-3563.

Sample No. 10 constituted LOVEL 275 to which was added 15% ammonium zirconium carbonate, in the form of a solution provided by Magnesium Elecktron Inc. which included the equivalent of 20% $ZrO_2$, and 40% DC Q1-3563.

Sample No. 11 constituted LOVEL 275 to which was added 25% zirconium basic carbonate, in the form of a powder provided by Magnesium Elecktron Inc. which included the equivalent of about 40% $ZrO_2$, and 30% DC Q1-3563.

Sample No. 12 constituted LOVEL 275 to which was added 15% zirconium basic carbonate and 40% DC Q1-3563.

Sample No. 13 constituted a 50/50 by weight mixture of LOVEL 275 and ZPB, to which was added 40% DC Q1-3563.

Sample No. 14 constituted a 50/50 by weight mixture of LOVEL 275 and ZPB, to which was added 20% DC Q1-3563.

Sample No. 15 constituted ZSH to which was added 30% DC Q1-3563.

Sample No. 16 constituted ZSH to which was added 20% DC Q1-3563.

Each of these samples was then tested for the percent of wetting at various methanol compositions, and the results obtained are set forth in Table 1 below.

TABLE 1

| Sample No. | % Wettability at Specified Methanol Concentrations, % | | | | | | | | | | |
|---|---|---|---|---|---|---|---|---|---|---|---|
| | 0 | 10 | 20 | 30 | 40 | 50 | 60 | 70 | 80 | 90 | 100 |
| 1 | 5 | | 15 | | 30 | | 50 | 95 | 100 | | |
| 2 | 0 | | | 5 | | | 20 | | 100 | | |
| 3 | | | | | | | 0 | 5 | 95 | 100 | |
| 4 | 5 | | | | 10 | | 60 | 85 | 100 | | |
| 5 | 0 | | | | 5 | | 10 | 85 | 100 | | |
| 6 | | | | | | | 0 | 25 | 100 | | |
| 7 | 0 | | | | | | 3 | 8 | 100 | | |

TABLE 1-continued

| Sample No. | % Wettability at Specified Methanol Concentrations, % | | | | | | | | | | |
|---|---|---|---|---|---|---|---|---|---|---|---|
| | 0 | 10 | 20 | 30 | 40 | 50 | 60 | 70 | 80 | 90 | 100 |
| 8 | 0 | | | | | | 5 | 30 | 100 | | |
| 9 | | | | | | | 0 | 3 | 100 | | |
| 10 | 0 | | | | | | 2 | 10 | 100 | | |
| 11 | | | | | | | 0 | 40 | 100 | | |
| 12 | | | | | | | 0 | 10 | 100 | | |
| 13 | 0 | | | | | | 5 | 8 | 100 | | |
| 14 | 5 | | 15 | 40 | | | 50 | | 100 | | |
| 15 | 0 | | | | | 0 | 0 | 3 | 5 | 100 | |
| 16 | | | | | | | 0 | 5 | 100 | | |

These results demonstrate the unexpected superiority of both the hydrophilic and hydrophobic compositions of the present invention. In particular, the best overall results were achieved with sample No. 15. Indeed, although this material included 30% of the hydrophobic component, it demonstrated superior hydrophobicity even to other components which contained greater amounts of the hydrophobic component. This evidence is believed to substantiate the belief that the presence of both silanol and zirconal bonding sites at the surface of the silica-containing compound results in increased stability and reactivity therefor.

The next best results were realized with samples Nos. 3 and 9. However, these included 40% of the hydrophobizing component, and one would presume that the best samples would result from the highest loading of hydrophobic material. Again, however, this was disproven by the superiority of sample No. 15 thereover. By thus reviewing these samples on a group-by-group basis, it can be seen that both sample Nos. 15 and 16 exceeded the hydrophobicity of others in their group (i.e., others with 20% and 30% of the hydrophobic component) and even some of the other products with 10% more of the hydrophobic component.

Furthermore, sample No. 8 far excelled over others within its group of 20% hydrophobic loading, and particularly important is the comparison with sample No 4, with a conventional silica gel, and sample No. 1, with the byproduct material. Clearly the presence of a substantially pure zirconium silica hydrogel, in this case with substantially all of the zirconium on the surface, showed unexpectedly superior results.

Returning to the 30% hydrophobic loading group, below sample No. 15, it was next noted that sample No. 7 gave the best performance, followed rather closely by sample No. 11. Each of these once again proved far superior to sample No. 2.

Similar results were again shown in the 20% hydrophobic loading group, where sample Nos. 8 and 16 were similar, and far superior to sample Nos. 4, 1, and the blend of sample No. 14.

It can therefore be seen that both the zirconium silica hydrogels produced by a co-precipitation technique and the zirconium silica hydrogel produced by treatment of a silica gel, each in a substantially pure form, demonstrated highly superior results not only when compared to concentrated silicon hydrogels but also when compared to the byproduct zirconium-containing materials discussed on page 4 of the specification. These results apply with equal force to both the hydrophilic and hydrophobic forms thereof.

EXAMPLE 2

In order to further demonstrate the superiority of the hydrophobic zirconium silica hydrogels of the present invention, they were again compared to a number of other forms of silica for their hydrophobicity, or their wetting ability. The tests were conducted as in Example 1, and the results obtained, as set forth in Table 2 below, demonstrate that, typically, the zirconium silica hydrogels of the present invention exhibited superior wetting and, typically, demonstrated total wetting at about 90% methanol, whereas, the competitive silica products with which they were compared typically demonstrated total wetting at 80% methanol or less.

TABLE 2

| Samp. No. | % Wettability at Specified Methanol Concentrations — Methanol Concentrations | | | | | | | | | | |
|---|---|---|---|---|---|---|---|---|---|---|---|
| | 0 | 10 | 20 | 30 | 40 | 50 | 60 | 70 | 80 | 90 | 100 |
| 17 | 0 | | | | | 3.3 | 6.7 | 26.7 | 100 | | |
| 18 | >0 | | | | | | >0 | 68.8 | 100 | | |
| 19 | 0 | | | | | >0 | 10 | 20 | 100 | | |
| 20 | >>0 | | | | | >0 | 10 | 20 | 70 | 100 | |
| 21 | >>0 | | 25 | 33 | | 58 | 90 | 100 | | | |
| 22 | >>0 | | 8 | | | 25 | 33 | 58 | 67 | 100 | |
| 23 | >>0 | | | 10 | | 20 | 30 | 60 | 80 | 100 | |
| 24 | >>>>0 | | | | | 63 | 90 | 100 | | | |
| 25 | >>0 | | | | | 10 | 18 | 30 | 85 | 100 | |
| 26 | >0 | | 5 | | | 10 | 20 | 95 | 100 | | |
| 27 | >0 | | | | | | | | 100 | | |
| 28 | 0 | | | | | 70 | 10 | 15 | 55 | 100 | |
| 29 | >>0 | | | | | 8 | 33 | 66 | 100 | | |
| 30 | 0 | | | | | 10 | 30 | 45 | 100 | | |
| 31 | >>0 | | | | | 10 | 30 | 70 | 100 | | |
| 32 | >0 | | | | | 70 | 10 | 20 | | 100 | |
| 33 | >>0 | | | | | 70 | 10 | 15 | 100 | | |
| 34 | >0 | | | | | 13 | 37 | 40 | 80 | 100 | |
| 35 | | | | | | 65 | 100 | | | | |
| 36 | | | | | | 30 | 60 | 100 | | | |
| 37 | | | | | | 10 | 20 | 60 | 95 | 100 | |

In Table 2, sample 17 constitutes a commercial hydrophobized fumed silica composition sold under the designation AEROSIL R-202 by Degussa, Inc.

Sample No. 18 comprised a hydrophobized precipitated silica product sold commercially as QUSO WR 55 (a trademark of Philadelphia Quartz Co.) and comprising a microfine precipitated amorphous silica having a fully hydroxylated surface used as a thickening, anticaking and reinforcing agent.

Sample No. 19 constituted another precipitated silica designated QUSO G35, which in this case was hydrophobized by 20% of a hydroxy reactive polydimethylsiloxane designated MAZER SFR 70 (a trademark of Mazer Chemicals, Inc.).

Sample No. 20 constituted 66% of the zirconium silica hydrogel of the present invention, hydrophobized with 33% MAZER SFR 70 (reacted at 200° C. overnight).

Sample No. 21 constituted 80% of the zirconium silica hydrogel of the present invention, hydrophobized with 20% MAZER SFR 70 (reacted at 200° C. overnight).

Sample No. 22 constituted 60% of the zirconium silica hydrogel of the present invention, hydrophobized with 40% of a polydimethylsiloxane polymer sold under the designation DOW CORNING 200 Fluid (1000 cps).

Sample No. 23 constituted 70% of the zirconium silica hydrogel of the present invention hydrophobized with 30% of a polydimethylsiloxane polymer sold under the designation DC Q1-3563 by Dow Corning Corporation.

Sample No. 24 constituted 74% of the zirconium silica hydrogel of the present invention, hydrophobized with 26% of a 60% emulsion of MAZER SFR 70 sold as MASIL EM 100R.

Sample No. 25 constituted 65% of the zirconium silica hydrogel of the present invention, hydrophobized with 35% of DCQ1-3563.

Sample No. 26 constituted QUSO WR55, hexane refluxed for one hour.

Sample No. 27 constituted sample No. 4, hexane refluxed for one hour.

Sample No. 28 constituted a hydrophobized precipitated silica product sold commercially as QUSO WR83 (a trademark of Philadelphia Quartz Co.).

Sample No. 29 constituted 66% of the zirconium silica hydrogel of the present invention, hydrophobized with 33% MAZER SFR 70.

Sample No. 30 constituted 66% QUSO G35, hydrophobized with 33% MAZER SFR 70.

Sample No. 31 constituted sample No. 23, hexane refluxed for one hour.

Sample No. 32 constituted sample No. 14, hexane refluxed for one hour.

Sample No. 33 constituted 66% of the zirconium silica hydrogel of the present invention, hydrophobized with 33% DOW CORNING 200 fluid with 1% of a methyltrimethoxysilane designated DOW CORNING Z-6070 Silane.

Sample No. 34 constituted sample No. 17, hexane refluxed for one hour.

Sample No. 35 constituted 80% of the zirconium silica hydrogel of the present invention, hydrophobized with 19% of CORNING DOW 200 Fluid and 1% of CORNING DOW Z-6070 Silane.

Sample No. 36 constituted 75% of the zirconium silica hydrogel of the present invention, hydrophobized with 24% of a polydimethylsiloxane polymer sold under the designation F-1006 (a trademark of Stauffer-Wacker Silicones Corp.); and Sample No. 37 constituted 70% of the zirconium silica hydrogel of the present invention, hydrophobized with 29% F-1006 and 1% CORNING DOW Z-6070 Silane.

EXAMPLE 3

Another example was carried out to demonstrate the unexpected utility of the zirconium silica hydrogels of the present invention, in this case particularly as an additive in paint compositions. In particular, use of the zirconium silica hydrogel of the present invention was compared with the use of a conventional commercial silica gel identified as SILCRON G-500 and sold by SCM Corporation under that designation. For this purpose, paint compositions including both a white thermoset enamel coating and a white medium oil alkyd enamel coating were prepared on a comparable basis with both such components and tested for a variety of standard tests. In particular, the following comparable formulations of a white thermoset enamel coating were produced set forth in Table 3 below:

TABLE 3

| White Thermoset Enamel Compositions | | |
|---|---|---|
| | Sample A | Sample B |
| | (Parts by weight) | |
| Component | | |
| Beckosol 12-054 | 200.0 | 200.0 |
| Bentone 34 (organic deriv. of hydrous magnesium silicate) | 5.0 | 5.0 |
| Aromatic 100 | 50.0 | 50.0 |
| Zopaque RCL-9 | 242.0 | 242.0 |
| Zirconium silica hydrogel | 75.0 | — |
| SILCRON G-500 | — | 75.0 |
| This intermediate composition was then placed in a pebble mill and dispersed, and the following ingredients were then added to each sample: | | |
| Additional Components | | |
| Beckosol 12-054 | 140.0 | 140.0 |
| Beckomise 21-505 (a urea-formaldehyde resin sold by Reichhold Chemicals, Inc.) | 172.0 | 172.0 |
| Super Bechamine (another such urea formaldehyde resin) | 45.0 | 45.0 |
| Xylol | 70.0 | 70.0 |
| Dow Additive No. 11 | 3.5 | 3.5 |
| Total Weight | 1,002.5 | 1,002.5 |

The products were then each baked for 15 minutes at 300° F.

As for a comparative test for a white medium oil alkyd enamel coating, the comparative compositions used are set forth in Table 4 as follows:

TABLE 4

| White Medium Oil Alkyl Enamel Composition | | |
|---|---|---|
| | Sample C | Sample D |
| | (Parts By Weight) | |
| Component | | |
| AROPLAZ 1082-M-50 | 250.0 | 250.0 |
| Bentone 34 (organic deriv. of hydrous magnesium silicate) | 4.0 | 4.0 |
| Mineral Spirits | 40.0 | 40.0 |
| TiPure R-960 | 250.0 | 250.0 |
| Zirconium Silica Hydrogel | 75.0 | — |
| Silicon G-100 | — | 75.0 |
| This intermediaite composition was then placed in a pebble mill and dispersed, and the following ingredients were then added to each sample: | | |
| Additional Components | | |
| Aroplaz 1082-M-50 | 150.0 | 150.0 |
| Mineral Spirits | 113.0 | 113.0 |
| 6% Ca Nuxtra | 5.7 | 5.7 |

TABLE 4-continued

| White Medium Oil Alkyl Enamel Composition | | |
|---|---|---|
| | Sample C | Sample D |
| | (Parts By Weight) | |
| 6% Co Nuxtra | 1.6 | 1.6 |
| 6% Zr Nuxtra | 3.6 | 3.6 |
| Exkin No. 2 | 1.0 | 1.0 |
| Total Weight | 893.9 | 893.9 |

The products were then each baked for 15 minutes at 300° F.

Each of these samples was then subject to various tests of their respective properties, and the results of these tests are set forth in Table 5 below:

TABLE 5

| Test Results for Various Paint Samples | | | | |
|---|---|---|---|---|
| | Sample | | | |
| | A | B | C | D |
| Firmness of Grind (Heg.) (ASTM 0-1210) | 6 | 6 | 7 | 7 |
| Viscosity (KU) (ASTM D-562) | | | | |
| Initial | 74 | 86 | 57 | 62 |
| 2 weeks @ 125° F. | 141+* | 141+* | 50 | 67 |
| Change | 67+ | 55+ | 7 | 5 |
| Package Stability (Score) (ASTM D-1849) | | | | |
| Skinning | 10 | 10 | | |
| Liquid Separation | 10 | 10 | 9 | 8 |
| Settling | | | 6 | 9 |
| Ease of Mix | | | 6 | 8 |
| Cure MEK rubs Cycles | 250+ | 250+ | — | — |
| Speed of Dry (Hrs.) | | | | |
| Set to touch | | | 0.4 | 0.4 |
| Tack free | | | 8-16 | 0.7 |
| Dry hard | | | 8-16 | 1.1 |
| Dry through (ASTM D-1640) | — | — | 8-16 | 1.8 |
| Gloss - 60° (Units) (ASTM D-523) | 12 | 5 | 14 | 4 |
| Sheen - 85° (Units) | 37 | 11 | 57 | 45 |
| Reflectance (%) (ASTM E-97) | 88.7 | 89.4 | 87.2 | 92.0 |
| Contrast Ratio (FTMS 141, Method 4122.1) | .96 | .96 | .97 | .98 |
| Flexibility Elongation (%) (ASTM D-1737) | 28 | 28 | 28 | 28 |
| Adhesion (%) (ASTM D-3359) | 95 | 95 | 90 | 75 |
| Abrasion Resistance (CS-10, 500 gms Mgms Loss/100 cycles) (ASTM D-4060) | 59 | 73 | 82 | 100 |
| Water Resistance (3 weeks -) ASTM Score | | | | |
| Blistering | 6D | 10 | 6D | 10 |
| Gloss Change | 10 | 10 | 10 | 8 |
| Color Change | 10 | 20 | 10 | 2 |
| Softening (ASTM D-1308) | 10 | 10 | 9 | 9 |
| Salt Fog Resistance (300 hrs.) | | | | |
| Blistering | | | | |
| Overall | 8M | 4D | 10 | 10 |
| At Scribe (ASTM B-117) | 2F | 2D | 10 | 10 |
| Rusting (Score) | | | | |
| Overall | 10 | 10 | 10 | 1 |
| At Scribe | 8 | 2 | 9 | 1 |
| Accelerated Weathering (300 hrs. - Score) | | | | |
| Gloss change | 9 | 9 | 10 | 10 |

TABLE 5-continued

Test Results for Various Paint Samples

| | Sample | | | |
|---|---|---|---|---|
| | A | B | C | D |
| Chalking | 10 | 10 | 10 | 10 |
| Cracking | 10 | 10 | 10 | 10 |
| Color change (ASTM G-53) | 8 | 9 | 10 | 0 |

*Samples gelled.

In connection with Table 5 and the results shown therein, since some of these observations were objective in nature, they were scored using the following ASTM standardized scoring system in order to avoid more lengthy descriptions thereof:

| Score | Performance | Effect |
|---|---|---|
| 10 | Perfect | None |
| 9 | Excellent | Trace |
| 8 | Very Good | Very Slight |
| 6 | Good | Slight |
| 4 | Fair | Moderate |
| 2 | Poor | Considerable |
| 1 | Very Poor | Severe |
| 0 | No Value | Complete Failure |

Furthermore, in connection with the blistering test, (ASTM D-714) the following code was utilized:

| Size | Frequency |
|---|---|
| 10 (no blistering) | F-Few |
| 8 (very small) | M-Medium |
| 6 (small) | MD-Medium Dense |
| 4 (moderate) | D-Dense |
| 2 (large) | |

Based upon these test results, in areas such as ease of dispersion, the zirconium and silica or silicate-containing compounds and hydrogel products of the present invention do not demonstrate any discernible advantage over the prior silica gel commercial components. With respect to flattening efficiency, in fact, the zirconium silica hydrogels of the present invention appear to be somewhat less efficient in flattening as the silicon products. However, the results demonstrated superior abrasion resistance and corrosion resistance in both of these paint compositions. Furthermore, the products of the present invention also exhibited superior water resistance, particularly with the air-dried alkyd enamel, including a marked superiority in color retention. This latter advantage was also noted in the results in the accelerated weathering tests, at least for the alkyd enamel.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements ma be devised without departing from the spirit and scope of the present invention as defined by the appended claims.

What is claimed is:

1. A substantially pure zirconium silica hydrogel containing at least about five wt. % water bound as a hydrate in its as-dried form comprising silicon and zirconium including silicon as $SiO_2$ in an amount of between about 60 and 99 wt. % of said hydrogel and zirconium as $ZrO_2$ in an amount of between about 1 and 40 wt. % of said hydrogel, wherein substantially all of said zirconium is bound to said $SiO_2$ in said hydrogel, and said hydrogel is substantially free of silica gel which is not bound to said zirconium, said hydrogel having a surface hydroxyl content greater than about one OH group per $nm^2$.

2. The zirconium silica hydrogel of claim 1 comprising between about 90 and 99 wt. % of said silicon and between about 1 and 10 wt. % of said zirconium.

3. The zirconium silica hydrogel of claim 1 comprising between about 93 and 98 wt. % of said silica and between about 2 and 7 wt. % of said zirconium.

4. The zirconium silica hydrogel of claim 1 having an index of refraction of between about 1.5 and 1.8.

5. The zirconium silica hydrogel of claim 1 having an average surface area of between about 350 and 400 $m^2$ per gram.

6. A hydrophilic zirconium and silica or silicate-containing hydrogel including surface silanol groups such that such hydrogel has a surface hydroxyl content greater than about one OH group per $nm^2$ and comprising at least about 5 wt. % water bound as a hydrate in its as-dried form comprising silicon and zirconium wherein substantially all of said zirconium is bound to the surface of said hydrogel.

7. The hydrophilic zirconium and silica or silicate-containing hydrogel of claim 6 wherein said silicon is present as $SiO_2$ in an amount of between about 60 and 99 wt. % of said compound.

8. The hydrophilic zirconium and silica or silicate-containing hydrogel of claim 7 wherein said zirconium is present as $ZrO_2$ in an amount of between about 1 and 40 wt. % of said hydrogel.

9. The hydrophilic zirconium and silica or silicate-containing hydrogel of claim 8 comprising between about 90 and 99 wt. % of said silicon and between about 1 and 10 wt. % of said zirconium.

10. The hydrophilic zirconium and silica or silicate-containing hydrogel of claim 9 comprising between about 93 and 98 wt. % of said silicon and between about 2 and 7 wt. % of said zirconium.

11. A method for manufacturing zirconium silica hydrogel comprising reacting an alkali metal silicate with a zirconium compound in an aqueous medium wherein said reaction is primarily a zirconium silica co-precipitation at a pH of between about 10 and 12 so as to produce a zirconium silica hydrogel containing at least about 5 wt. % water bound as a hydrate and including silicon as $SiO_2$ in an amount of between about 60 and 99 wt. % of said hydrogel and zirconium as $ZrO_2$ in an amount of between about 1 and 40 wt. % of said hydrogel, wherein substantially all of said zirconium is bound to said silica in said hydrogel, and subsequently adjusting said pH of said hydrogel so as to neutralize same.

12. The method of claim 11 wherein said adjusting of said pH comprises the addition of acid to said aqueous medium.

13. The method of claim 12 wherein said acid is selected from the group consisting of mineral acids and organic acids.

14. The method of claim 11 wherein said adjusting of said pH comprises adjusting said pH to a pH of between about 6.8 and 7.8.

15. The method of claim 11 wherein said alkali metal silicate comprises sodium silicate.

16. The method of claim 11 wherein said zirconium compound comprises a zirconium salt.

17. The method of claim 16 wherein said zirconium salt is selected from the group consisting of zirconium chloride, zirconium oxychloride, zirconium hydroxychloride, zirconium sulfate, zirconium orthosulfate, zirconium carbonate, zirconium nitrate, zirconium acetate, and mixtures thereof.

18. The method of claim 11 wherein said alkali metal silicate is prepared by a reacting silicon dioxide with an alkali metal compound.

19. The method of claim 18 wherein said alkali metal compound is selected from the group consisting of alkali metal hydroxides and alkali metal carbonates.

20. The method of claim 19 wherein said alkali metal hydroxide comprises sodium hydroxide.

21. The method of claim 11, wherein said reaction is conducted at about room temperature.

22. A method for manufacturing a zirconium silica hydrogel comprising reacting zircon with an alkali metal compound at elevated temperatures so as to produce a soluble zirconyl silicate, and precipitating said zirconium silica hydrogel from said soluble zirconyl silicate at a pH of between about 10 and 12 so as to produce said zirconium silica hydrogel containing at least about 5% water bound as a hydrate and including silicon as $SiO_2$ in an amount of between about 60 and 99 wt. % of said hydrogel and zirconium as $ZrO_2$ in an amount of between about 1 and 40 wt. % of said hydrogel, and subsequently adjusting said pH so as to neutralize said hydrogel.

23. The method of claim 22 wherein said reacting step is carried out in the presence of silicon dioxide.

24. The method of claim 22 wherein said elevated temperature comprises a temperature of between about 800 and 1,200° C.

25. The method of claim 22 wherein said alkali metal compound is selected from a group consisting of alkali metal hydroxides and alkali metal carbonates.

26. The method of claim 25 wherein said alkali metal hydroxide comprises sodium hydroxide, said alkali metal carbonate comprises sodium carbonate, and said soluble zirconyl silicate comprises sodium zirconyl silicate.

27. The method of claim 22 wherein said adjusting of said pH comprises adding sufficient acid to said hydrogel to lower said pH to between about 6.8 and 7.8.

28. A method for manufacturing a zirconium silica hydrogel comprising providing a silica-containing compound including surface silanol groups, and contacting said silica-containing compound with a zirconium compound so as to bind said zirconium to the surface of said silica-containing compound, said zirconium being present in an amount sufficient to improve the stability of said silica-containing compound and having a surface hydroxyl content greater than about one OH group per $nm^2$, and drying said hydrogel at a temperature of between about 100 and 300° C.

29. The method of claim 28 wherein said silica-containing compound comprises a silica hydrogel.

30. The method of claim 28 wherein said zirconium is present in an amount of between about 1 and 40 wt. % of said silica-containing compound.

31. The method of claim 28 wherein said zirconium compound comprises a zirconium salt.

32. The method of claim 31 wherein said zirconium salt is selected from the group consisting of zirconium chloride, zirconium oxychloride, zirconium hydroxychloride, zirconium sulfate, zirconium orthosulfate, zirconium carbonate, zirconium nitrate, zirconium acetate, and mixtures thereof.

* * * * *

UNITED STATES PATENT AND TRADEMARK OFFICE
CERTIFICATE OF CORRECTION

PATENT NO. : 5,069,816

DATED : December 3, 1991

INVENTOR(S) : DeSantis el al.

It is certified that error appears in the above-identified patent and that said Letters Patent is hereby corrected as shown below:

Column 2, line 55, after "thod" " " should read -- --.

Column 3, line 16, after "use" insert --.--.

Column 3, line 37 "applicants," should read --applicants'--.

Column 3, line 48, "about" should read --about 1--.

Column 3, line 55, "about" should read --about 1--.

Column 5, line 57, "about" should read --about 1--.

Column 7, line 31, "compounds" should read --compounds which--.

Column 9, line 62, "per nm" should read --per square nanometer and may approach 1004 groups per sq. nm.--.

Column 9, line 64, ""QUSO"" should read --"QUSO"--.

Column 11, line 27, "employee" should read --employed--.

Column 14, line 21, "an" should read --and--.

Column 14, line 47, "Zr-O-Si-" should read -- -Zr-O-Si- --.

Column 15, line 33, "methyltrlchlorosilane" should read --methyltrichlorosilane--.

UNITED STATES PATENT AND TRADEMARK OFFICE
CERTIFICATE OF CORRECTION

PATENT NO. : 5,069,816
DATED : December 3, 1991
INVENTOR(S) : DeSantis et al.

It is certified that error appears in the above-identified patent and that said Letters Patent is hereby corrected as shown below:

Column 15, line 35, "trichloroorganosilanes" should read --trichloro-organosilanes--.

Column 18, line 61, "system" should read --system.--.

Column 19, line 49, "and wt." should read --and 8 wt.--.

Column 19, line 68, "3 wt." should read --30 wt.--.

Column 20, line 57, "fine" should read --finer--.

Column 21, line 24, "and" should read --and 30%--.

Column 22, line 43, "No" should read --No.--.

Column 26, line 51, "100" should read --1000--.

Column 27, line 60, "ma" should read --may--.

Signed and Sealed this

Twenty-fourth Day of August, 1993

Attest:

BRUCE LEHMAN

*Attesting Officer*  *Commissioner of Patents and Trademarks*